(12) United States Patent
Song et al.

(10) Patent No.: US 9,965,069 B2
(45) Date of Patent: May 8, 2018

(54) ORGANIC ELECTROLUMINESCENT DEVICE HAVING TOUCH PANEL AND METHOD FOR FABRICATING THE SAME

(71) Applicant: LG DISPLAY CO., LTD., Seoul (KR)

(72) Inventors: EunAh Song, Paju-si (KR); HeeChul Lim, Paju-si (KR); HyunTae Byun, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 448 days.

(21) Appl. No.: 14/540,767

(22) Filed: Nov. 13, 2014

(65) Prior Publication Data

US 2015/0160767 A1 Jun. 11, 2015

(30) Foreign Application Priority Data

Dec. 6, 2013 (KR) .................. 10-2013-0151718

(51) Int. Cl.
| | | |
|---|---|---|
| *G06F 3/041* | (2006.01) | |
| *G09G 3/3208* | (2016.01) | |
| *G06F 3/044* | (2006.01) | |
| *G09G 5/00* | (2006.01) | |

(52) U.S. Cl.
CPC ............ *G06F 3/0412* (2013.01); *G06F 3/044* (2013.01); *G09G 3/3208* (2013.01); *G06F 2203/04103* (2013.01); *G09G 5/00* (2013.01); *G09G 2300/023* (2013.01); *G09G 2354/00* (2013.01)

(58) Field of Classification Search
CPC ......... G06F 2203/04103; G06F 3/0412; G06F 3/044; G09G 2300/023; G09G 2354/00; G09G 3/3208; G09G 5/00

USPC .................................................. 345/173, 174
See application file for complete search history.

(56) References Cited

U.S. PATENT DOCUMENTS

| | | | | |
|---|---|---|---|---|
| 6,885,157 | B1 * | 4/2005 | Cok ...................... | H01L 27/323 315/169.2 |
| 9,299,750 | B2 * | 3/2016 | Lim ....................... | H01L 27/323 |
| 9,501,165 | B2 * | 11/2016 | Kim ....................... | G06F 3/0412 |
| 2004/0239641 | A1 | 12/2004 | Takahata et al. | |
| 2011/0242021 | A1 | 10/2011 | Jun et al. | |
| 2014/0035935 | A1 * | 2/2014 | Shenoy .................. | H01L 23/15 345/501 |
| 2014/0062916 | A1 * | 3/2014 | Hong ...................... | G06F 3/041 345/173 |
| 2014/0152912 | A1 * | 6/2014 | Lee ....................... | G06F 3/0412 349/12 |

(Continued)

FOREIGN PATENT DOCUMENTS

| | | |
|---|---|---|
| CN | 102087432 A | 6/2011 |
| CN | 102339189 A | 2/2012 |

(Continued)

*Primary Examiner* — Dmitriy Bolotin
(74) *Attorney, Agent, or Firm* — Dentons US LLP

(57) ABSTRACT

Provided is an organic electroluminescent device (OLED) having a display area and a non-display area outside the display area that may include an OLED panel including a plurality of organic light-emitting diodes in a cell end line of the display area on an array substrate; and a touch panel on the OLED panel, the touch panel including a plurality of touch contact holes in the non-display area, wherein at least two of the plurality of touch contact holes that are immediately adjacent to the cell end line have substantially the same distance from the cell end line, and method for fabricating the same.

15 Claims, 6 Drawing Sheets

(56) References Cited

U.S. PATENT DOCUMENTS

| | | | | |
|---|---|---|---|---|
| 2014/0204285 A1* | 7/2014 | Jang | ................. | G06F 3/044 349/12 |
| 2014/0375907 A1* | 12/2014 | Wu | ................. | G06F 3/0412 349/12 |
| 2015/0185942 A1* | 7/2015 | Kim | ................. | G06F 3/0412 345/173 |
| 2015/0331508 A1* | 11/2015 | Nho | ................. | G06F 3/0421 345/173 |

FOREIGN PATENT DOCUMENTS

| | | | |
|---|---|---|---|
| CN | 102467289 A | 5/2012 | |
| CN | 103218092 A | 7/2013 | |
| JP | 2007-121809 A | 5/2007 | |

\* cited by examiner

ORGANIC ELECTROLUMINESCENT DEVICE HAVING TOUCH PANEL AND METHOD FOR FABRICATING THE SAME

CROSS-REFERENCE TO RELATED APPLICATIONS

This application claims the benefit of Korean Patent Application No. 10-2013-0151718, filed on Dec. 6, 2013, which is hereby incorporated by reference for all purposes as if fully set forth herein.

BACKGROUND OF THE INVENTION

Field of the Invention

The present invention relates to an organic electroluminescent device (OLED) and method for fabricating the same, and more particularly, to an OLED having a touch panel.

Discussion of the Related Art

Until recently, cathode ray tubes (CRTs) have been mainly used, but in recent years, flat display devices such as plasma display panels (PDPs), liquid crystal display devices (LCDs), organic electroluminescent devices (OLEDs) or the like have been widely studied and replacing CRTs.

Among such flat panel display devices, OLEDs, which are a self-light emitting device, allow for lightweight and low profile design because a backlight unit, which is used in LCDs, is generally not required.

Furthermore, such OLEDs have advantages over LCDs in terms of excellent viewing angle and contrast ratio, advantageous power consumption, direct current (DC) low voltage driving, fast response speed, high resistance to external impacts due to solid internal structure, wide range of temperatures for use, and the like. Thus, OLEDs are widely used for portable personal devices, such as mobile terminals, PDAs, laptop computers, and the like.

In recent years, touch panels, which enables users to enter texts or pictures in a more convenient and elaborate manner, have been widely used for personal digital assistants or personal information processing devices. As a result, a touch panel type OLED, in which a touch panel is adhered to an OLED panel, has been introduced.

Such a touch panel type OLED is fabricated by forming a touch panel and an OLED panel, respectively, and then adhering the two panels to each other through an adhesive layer. The touch panel may include an upper film formed with an upper electrode, a lower film formed with a lower electrode, with a predetermined space between the upper and the lower film. The OLED panel may include a switching element, an organic light emitting diode, a protective layer for encapsulation and a protective film for protecting the OLED panel from external environments on a substrate.

Touch panels can be classified into an add-on type, an on-cell type, and an in-cell type. For a display device having the add-on type touch panel, an additional touch sensor (TS) is formed subsequent to the encapsulation process, and thus, the display panel and the touch sensor have their own separate structures that are attached together. On the other hand, for a display device having the on-cell type or in-cell type touch panel, touch sensors may be formed on both surfaces in which a display panel is encapsulated, thereby providing a structure in which the display panel and the touch sensors (TSs) are integrated.

A display device having the add-on type touch panel has high reliability because the touch contact holes are located away from the cell end line. However, a display device having the on-cell type or in-cell type touch panel may have a reliability problem because the touch contact holes are located within the display device having the touch panel.

FIG. 1 is a schematic plan view illustrating an OLED having a circular type cell region according to the related art. FIG. 2 is an enlarged plan view of portion "A" in FIG. 1, schematically illustrating a cell end line and a plurality of touch contact holes in an OLED according to the related art.

As illustrated in FIGS. 1 and 2, in case of a structure having a circular cell end line other than a linear cell end line, touch contact holes 31a, 31b, 31c are typically provided at different locations from the cell end line, with different distances, such as a first distance (d1), a second distance (d2) and a third distance (d3). This may adversely affect reliability, especially due to the touch contact hole 31a having the shorter distance (d1) from the cell end line. In other words, when touch contact holes are located on a straight line in a display device having a circular type panel, as illustrated in FIGS. 1 and 2, the touch contact holes located near the cell end line with short distances are more susceptible to moisture permeation as compared with the other touch contact holes.

SUMMARY OF THE INVENTION

Accordingly, the present invention is directed to an organic electroluminescent device (OLED) having a touch panel and method for fabricating the same that substantially obviates one or more of the problems due to limitations and disadvantages of the related art.

An advantage of the present invention is to provide an OLED with enhanced reliability relating to external moisture permeation through touch contact holes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an organic electroluminescent device (OLED) having a display area and a non-display area outside the display area may, for example, include an OLED panel including a plurality of organic light-emitting diodes in a cell end line of the display area on an array substrate; and a touch panel on the OLED panel, the touch panel including a plurality of touch contact holes in the non-display area, wherein at least two of the plurality of touch contact holes that are immediately adjacent to the cell end line have substantially the same distance from the cell end line.

In another aspect of the present invention, a method of fabricating an organic electroluminescent device (OLED) having a display area and a non-display area outside the display area may, for example, include forming an OLED panel including a plurality of organic light-emitting diodes on an array substrate; forming a plurality of touch contact holes passing through a touch substrate in the non-display area, the plurality of touch contact holes located at substantially the same distance from a cell end line of the display area; forming an upper touch electrode and a lower electrode at upper and lower surfaces of the touch substrate, respectively; forming a lower touch electrode connection pattern electrically connected to a lower touch electrode of the touch panel through one of the plurality of touch contact holes; and adhering the OLED panel to the touch substrate using an adhesive.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts. Also, detailed description of publicly known elements may be omitted.

An organic electroluminescent device (OLED) having a circular cell region according to an embodiment of the present invention will be described in detail with reference to the accompanying drawings.

Figure 1:
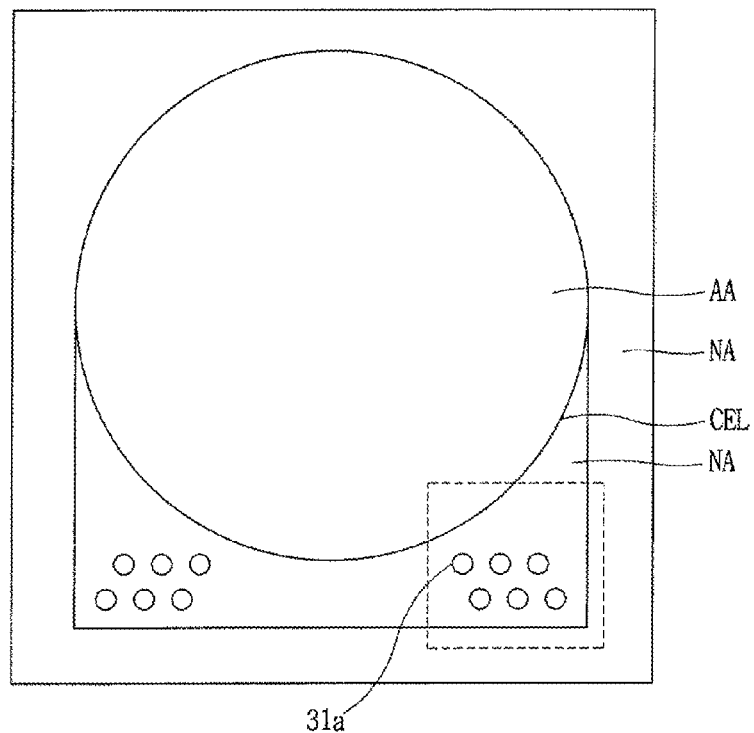
FIG. 1 is a schematic plan view illustrating an organic electroluminescent device (OLED) having a circular type cell region according to the related art.
Figure 2:
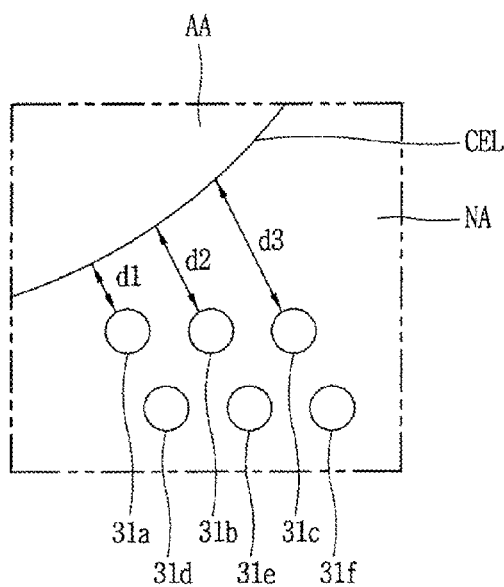
FIG. 2 is an enlarged plan view of portion "A" in FIG. 1, schematically illustrating a cell end line and a plurality of touch contact holes in an OLED according to the related art.
Figure 3:
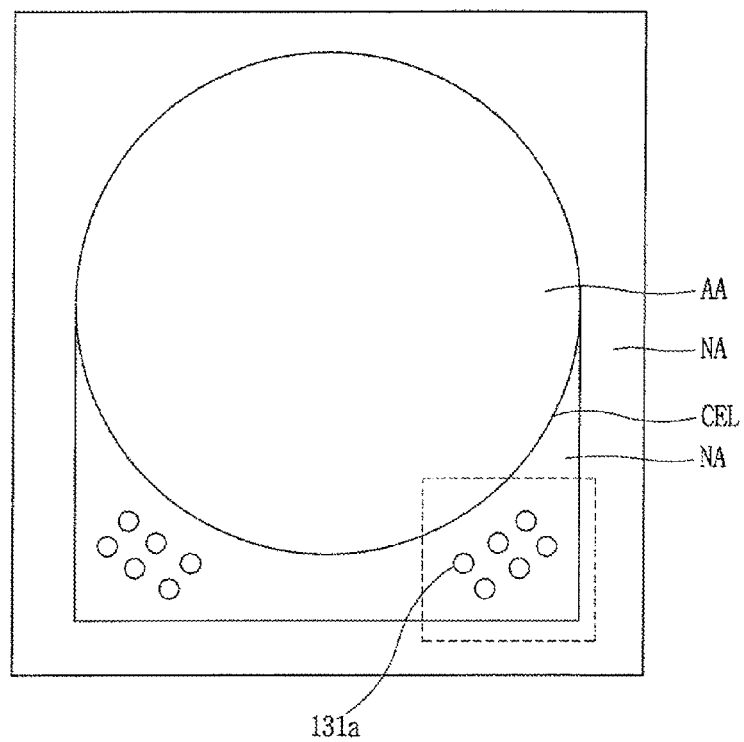
FIG. 3 is a schematic plan view illustrating an OLED having a circular type cell region according to an embodiment of the present invention.
Figure 4:
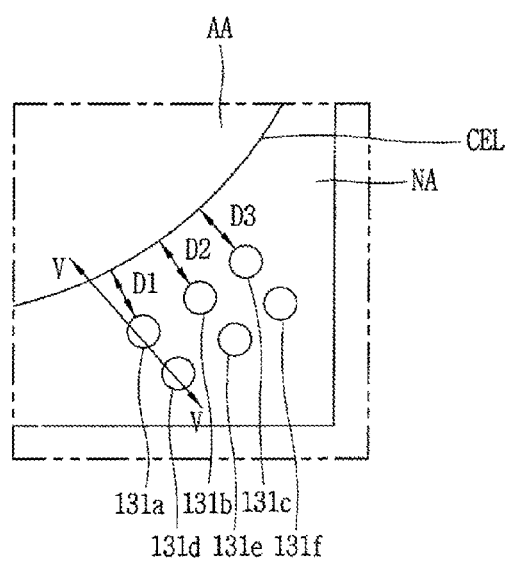
FIG. 4 is an enlarged plan view of portion "B" in FIG. 3, schematically illustrating a cell end line and a plurality of touch contact holes in an OLED according to an embodiment of the present invention.
Figure 5:
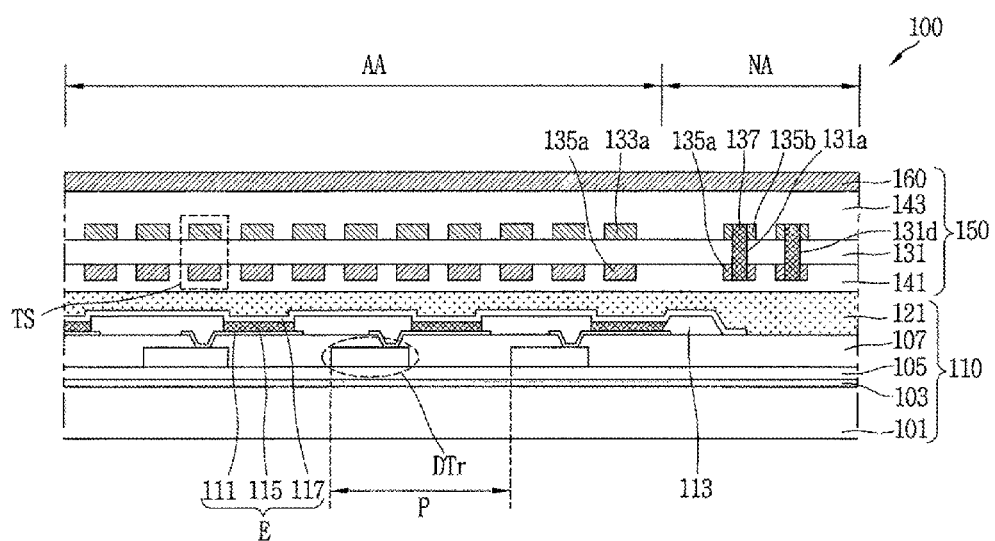
FIG. 5 is a cross-sectional view along line V-V in FIG. 4, schematically illustrating an OLED according to an embodiment of the present invention.

FIG. 3 is a schematic plan view illustrating an OLED having a circular type cell region according to an embodiment of the present invention. FIG. 4 is an enlarged plan view of portion "B" in FIG. 3, schematically illustrating a cell end line and a plurality of touch contact holes in an OLED according to an embodiment of the present invention. FIG. 5 is a cross-sectional view along line V-V in FIG. 4, schematically illustrating an OLED according to an embodiment of the present invention.

Referring to FIGS. 3 and 4, a touch panel type OLED 100 according to an embodiment of the present invention is divided into a circular type display area (AA) and a non-display area (NA) outside the display area. The OLED 100 includes a plurality of touch contact holes 131a, 131b, 131c, 131d, 131e, 131f at one side of the non-display area (NA) for connecting a plurality of lower touch electrodes (135a, shown in FIG. 5) of a touch panel to an external power source or the like.

As illustrated in FIGS. 3 and 4, the touch contact holes 131a, 131b, 131c, 131d, 131e, 131f are provided in a straight line direction. In particular, the touch contact holes 131a, 131b, 131c are provided in a first column, and the touch contact holes 131d, 131e, 131f are provided in a second column, with the first and second columns being separated from each other at a predetermined distance.

Distances D1, D2, D3 from the touch contact holes 131a, 131b, 131c in the first column to the cell end line CEL are configured to be substantially the same. Similarly, distances from the touch contact holes 131d, 131e, 131f in the second column to the cell end line CEL are configured to be substantially the same.

The OLED 100 includes an OLED panel 110 having an organic light-emitting diode (E) in each pixel region and a touch panel 150 having a touch sensor (TS). The OLED panel 100 may include a driving thin film transistor (DTr, shown in FIG. 5) and a switching thin film transistor in each pixel.

More specifically, as illustrated in FIG. 5, the OLED panel 110 includes a driving transistor (DTr) in each pixel region (P) on an array substrate 101. Although not shown in FIG. 5, the driving transistor (DTr), which is formed near the crossing between a gate line and a data line defining each pixel region (P), may include a gate electrode, a semiconductor layer, a source electrode and a drain electrode.

The OLED panel 110 may further include a first electrode 111 connected to a drain electrode (not shown) of each driving transistor (DTr), an organic light-emitting layer 115 emitting a specific color of light on the first electrode 111, and a second electrode 117 on the organic light-emitting layer 115.

The first electrode 111, the second electrode 117 and the organic light-emitting layer 115 formed therebetween constitutes an organic light-emitting diode (E).

In the meantime, the OLED panel 110 can be classified into a top emission type and a bottom emission type according to the transmission direction of the emitted light, and the top emission type will now be described as an example.

The first electrode 111 serves as an anode electrode that may be formed of a transparent conductive material having a relatively large work function, and the second electrode 117 serves as a cathode electrode that may be formed of a metal material having a work function lower than that of the first electrode 111.

In the top emission type, the light emitted from the organic light-emitting layer 115 should pass through the second electrode 117, and thus, the second electrode 117 may be formed by depositing a transparent conductive material in a thick manner on a semi-transparent metal layer on which a metal material having a low work function is then deposited in a thin manner.

As a result, the light emitted from the organic light-emitting layer 115 is driven toward the second electrode 117 as the top emission type.

An adhesive layer 121 is provided on the driving transistor (DTr) and organic light-emitting diode (E), and the adhesive layer 121 may include an inorganic insulating material and/or an organic insulating material having an adhesive characteristic to protect the second electrode 117 of the organic light-emitting diode (E) and the organic light-emitting layer 115 from moisture permeation. In other words, the OLED panel 110 is encapsulated through the adhesive layer 121, thereby completing the OLED panel 110 according to an embodiment of the present invention.

The touch panel 150 is provided on the OLED panel 110 through the adhesive layer 121 of the OLED panel 110, which will now be described in more detail with reference to FIG. 5.

Referring to FIG. 5, the touch panel 150 is formed in such a manner that a plurality of upper touch electrodes 133a and a plurality of lower touch electrodes 135a are provided on upper and lower surfaces of a touch substrate 131, respectively, facing each other. The upper touch electrodes 133a are formed in the display area (AA) on the upper surface of the touch substrate 131, and the lower touch electrodes 135a are formed on the lower surface of the touch substrate 131 to face the upper touch electrodes 133a. A plurality of touch contact holes 131a (including the touch contact holes 131b, 131c, 131d, 131e, 131f shown in FIGS. 3 and 4) are formed in the non-display area (NA), and a plurality of lower touch electrode connection patterns 135b, which are connected to the lower touch electrodes 135a, are formed on the upper surface of the touch substrate 131 in the non-display area (NA) of the touch substrate 131.

Referring back to FIGS. 3 and 4, the distances D1, D2, D3 from each of the plurality of touch contact holes 131a, 131b, 131c to the cell end line CEL in the display area (AA) are configured to be substantially the same.

The upper touch electrodes 133a and lower touch electrodes 135a may be formed of a transparent conductive material such as indium tin oxide (ITO) or indium zinc oxide (IZO).

The upper touch electrodes 133a and lower touch electrodes 135a constitute a touch sensor (TS). In other words, the upper touch electrodes 133a may form a resistance network around the lower touch electrodes 135a, and the resistance network uniformly transmits a control signal to an entire surface of the lower touch electrodes 135a.

The upper touch electrodes 133a are formed in the display area (A/A) on the upper surface of the touch substrate 131, and the lower touch electrodes 135a are formed to face the upper touch electrodes 133a on the lower surface of the touch substrate 131. The lower touch electrode connection patterns 135b, which are connected to the lower touch electrodes 135a, are formed on the upper surface of the touch substrate 131 at the side portion of the touch substrate 131. The upper touch electrodes 133a and the lower touch electrodes 135a constitute the touch sensor (TS).

An electrode-connecting plug 137 is formed within the touch contact hole 131a through an electroplating method to connect the lower touch electrode 135a formed on the lower surface of the touch substrate 131 to the lower touch electrode connection pattern 135b formed around the touch contact hole 131a on the upper surface of the touch substrate 131, and thus the lower touch electrode 135a and the lower touch electrode connection pattern 135b are electrically connected to each other. An external power element or the like can be connected to the lower touch electrode connection pattern 135b and/or the upper touch electrode 133a.

A protective layer 141 is formed on an outer surface of the touch substrate 131 of the touch panel 150, namely, between the touch panel 150 and the adhesive layer 121. The protective layer 141 may reduce or prevent pollutants such as moisture or gas from being infiltrated into the organic light-emitting layer 115 of the organic light-emitting diode (E), thereby reducing or preventing deterioration of the organic light-emitting diode (E).

The protective layer 141 may be formed with a single layer or multiple layers using at least one or more materials selected from inorganic insulating materials including silicon nitride (SiNx), silicon oxide ($SiO_2$) and alumina ($Al_2O_3$) or organic insulating materials including polyacrylate, polyimide and benzocyclobutene (BCB). In other words, the protective layer 141 formed on the touch panel 150 may be formed of any one of inorganic insulating materials or organic insulating materials, and beneficially have a multi-layered structure with a combination of inorganic insulating materials and organic insulating materials to further enhance protection from pollutants such as moisture or gas.

A polarizing plate 160 may be formed on an outer surface of the touch panel 150 through an additional protective or encapsulation layer 143 to block external light incident toward a transmission direction of the light emitted from the organic light-emitting layer 115 of the OLED panel 110, thereby enhancing contrast. In other words, the OLED panel 110 has a disadvantage in that its contrast may be largely reduced due to external light, and thus, the polarizing plate 160 is adhered to the outer surface of the touch panel 150 to block the external light in the transmission direction of the light emitted from the OLED panel 110.

The polarizing plate 160 is beneficially a circular polarizing plate for blocking external light, and external light incident on the OLED panel 110 enters through the polarizing plate 160, and is then reflected by the second electrode 117, which changes its polarization direction. As a result, the external light may not pass through the polarizing plate 160 again, which may cause destructive interference, and thus, the OLED panel may have an enhanced contrast.

In the OLED 100 according to an embodiment of the present invention, the touch sensor (TS) of the touch panel 150 is a capacitor type configured with the upper touch electrodes 133a, lower touch electrodes 135a, and a gap between the upper and lower touch electrodes with a predetermined distance, and recognizes change in capacitance based on a fringe field variation of the capacitors when a finger or the like is brought into contact therewith.

Figure 6A:
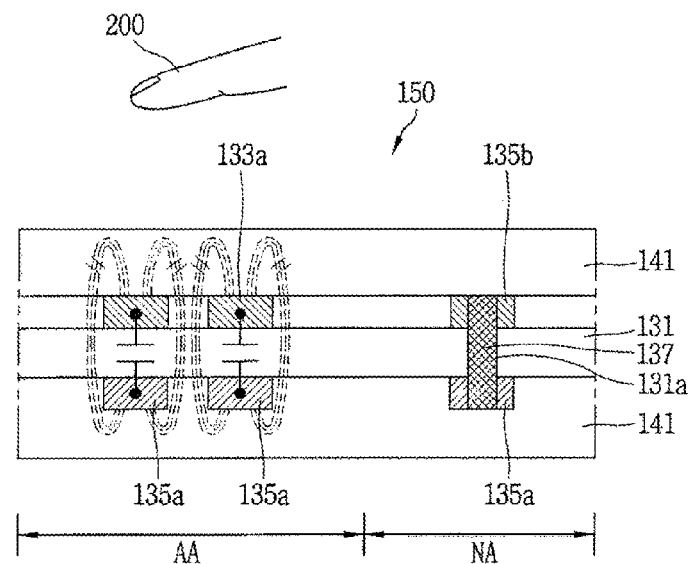
FIGS. 6A and 6B are cross-sectional views for schematically explaining operation of a touch sensor (TS) in a touch panel type OLED according to an embodiment of the present invention.
Figure 6B:
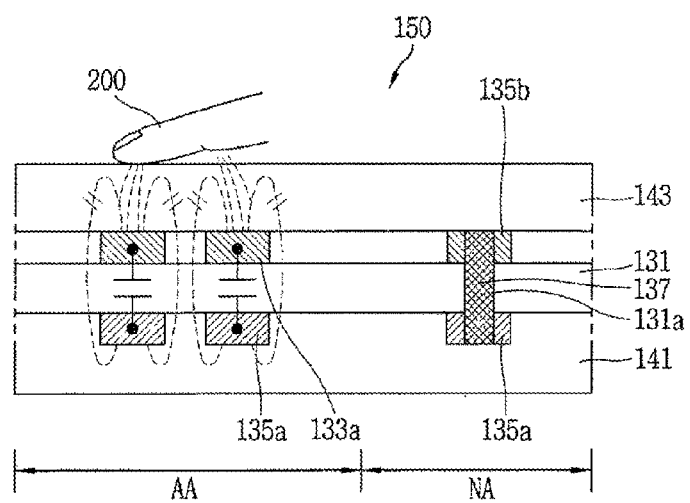

FIGS. 6A and 6B are cross-sectional views for schematically explaining operation of a touch sensor (TS) in a touch panel type OLED according to an embodiment of the present invention. For easy of understanding, the driving and switching thin film transistors, and the organic light-emitting diode, which are illustrated in FIG. 5, are omitted.

Referring to FIG. 6A, when a touch by a user's finger 200 or the like is not made on a surface of the touch panel 150, fringe fields formed between the lower touch electrodes 135a and the upper touch electrodes 133a are constantly maintained, and thus, there is no change in capacitance.

On the other hand, as illustrated in FIG. 6B, when a touch is made on or near the surface of the touch panel 150, fringe fields formed between the lower touch electrodes 135a and the upper touch electrodes 133a are affected by the touch, which causes a change in capacitance and enables operation of the touch sensor (TS) during a touch sensing phase.

As described above, an OLED having a touch panel according to an embodiment of the present invention has touch contact holes provided at substantially the same distance from the cell end line CEL, regardless of its shape, whether linear or circular type cell end line, to enhance reliability relating to external moisture permeation through the touch contact holes.

A method for fabricating an OLED having a touch panel according to an embodiment of the present invention will now be described with respect to FIGS. 7A through 7F. FIGS. 7A through 7F are cross-sectional views illustrating a method for fabricating an OLED according to an embodiment of the present invention.

Figure 7A:
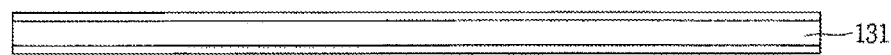
FIGS. 7A through 7F are cross-sectional views illustrating a method for fabricating an OLED according to an embodiment of the present invention.

Referring to FIG. 7A, a barrier substrate 131 is prepared, which is to be used as a touch substrate for the touch panel.

Figure 7B:
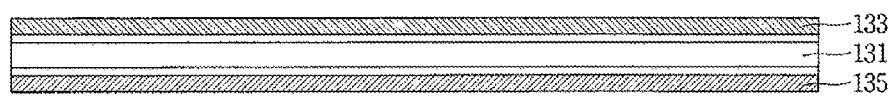

Referring to FIG. 7B, conductive layers 133, 135, which are, for example, made of ITO and/or a metal material that are beneficially transparent conductive materials, are formed on upper and lower surfaces of the touch substrate 131.

Figure 7C:
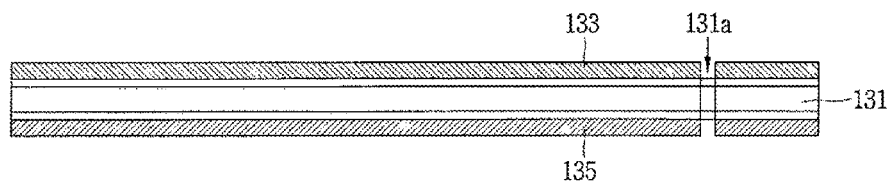

Referring to FIG. 7C, the conductive layers 133, 135 and the touch substrate 131 are selectively etched to form a touch contact hole 131a in the non-display area (NA) of the touch substrate 131. At this time, although now shown in FIG. 7C, a plurality of touch contact holes 131b, 131c, 131d, 131e, 131f (shown in FIG. 4) are formed at the same time. The touch contact holes 131a, 131b, 131c in the first column and the touch contact holes 131d, 131e, 131f in the second column are provided in a straight line direction.

Distances D1, D2, D3 from the touch contact holes 131a, 131b, 131c, respectively, in the first column to the cell end line CEL are substantially the same. Similarly, distances from the touch contact holes 131d, 131e, 131f, respectively, in the second column to the cell end line are substantially the same.

Figure 7D:
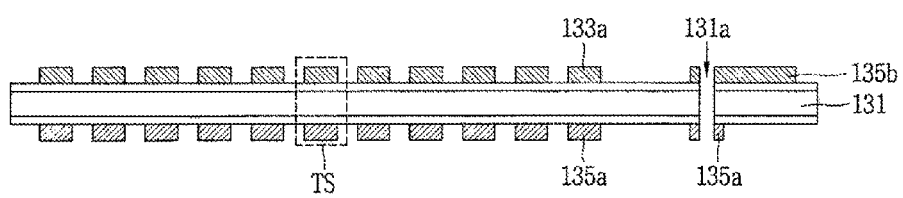

Referring to FIG. 7D, the conductive layers 133, 135 are selectively etched to form the upper touch electrodes 133a in the display area (AA) on an upper surface of the touch substrate 131, and the lower touch electrodes 135a on a lower surface of the touch substrate 131 to face the upper touch electrodes 133a. The lower touch electrode connection patterns 135b, which will be electrically connected to the lower touch electrodes 135a, are also formed on an upper surface of the touch substrate 131 in the non-display area (NA) of the touch substrate 131. The upper touch electrodes 133a and lower touch electrodes 135a constitute a touch sensor (TS).

Figure 7E:
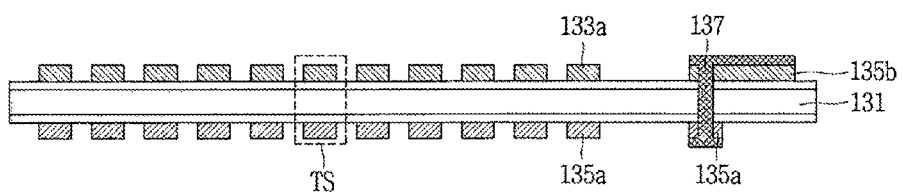

Referring to FIG. 7E, an electrode-connecting plug 137 is formed in the touch contact hole 131a by, for example, an electroplating method to connect the lower touch electrode 135a formed on the lower surface of the touch substrate 131 to the lower touch electrode connection pattern 135b formed around the touch contact hole 131a on the upper surface of the touch substrate 131, and thus the lower touch electrode 135a and the lower touch electrode connection pattern 135b are electrically connected to each other. An external power element or the like is connected to the lower touch electrode connection pattern 135b and the upper touch electrode 133a.

In this manner, the touch panel 150 constituting the touch sensor (TS) is formed.

A protective layer 141 is then formed between the touch panel 150 and the adhesive layer 121. The protective layer 141 may reduce or prevent pollutants such as moisture or gas from being infiltrated into the organic light-emitting layer 115 of the organic light-emitting diode (E), thereby reducing or preventing deterioration of the organic light-emitting diode (E).

The protective layer 141 may be formed with a single layer or multiple layers using at least one or more materials selected from inorganic insulating materials including silicon nitride (SiNx), silicon oxide (SiO2) and alumina (Al2O3) or organic insulating materials including polyacrylate, polyimide and benzocyclobutene (BCE). In other words, the protective layer 141 formed on the touch panel 150 may be formed of any one of inorganic insulating materials or organic insulating materials, beneficially have a multi-layered structure with a combination of inorganic insulating materials and organic insulating materials to further enhance protection from pollutants such as moisture or gas.

The touch panel 150 is then adhered to the OLED panel 110 in which driving and switching thin film transistors and an organic light-emitting diode (E) are formed, thereby completing the OLED 100 having the touch panel 150.

A method of fabricating the OLED panel 110 will now be described with reference to FIG. 7F.

Figure 7F:
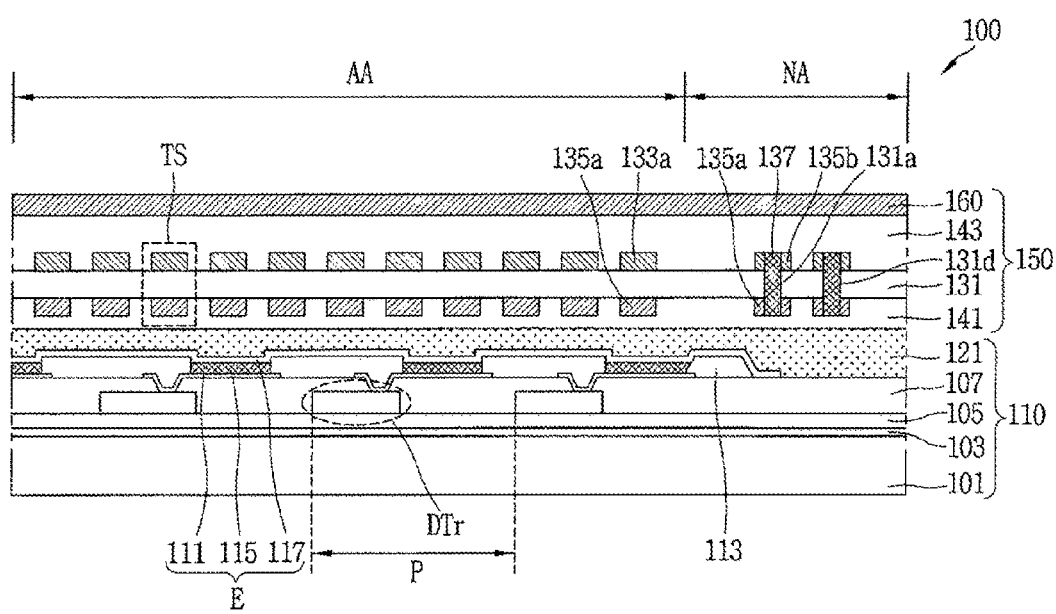

Referring to FIG. 7F, an array substrate 101 having a display area (AA) and a non-display area (NA) outside the display area (AA) is prepared. The array substrate 101 may be made of a glass material or a plastic material having a flexible characteristic.

Next, buffer layers 103, 105 made of, for example, an inorganic insulating material are formed on the array substrate 101. Any one or more materials selected from inorganic insulating materials including $SiO_2$, SiN, SiON, $SiH_4$, $NH_3$, $N_2O$, $N_2$ can be used for the buffer layers 103, 105.

The buffer layers 103, 105 may serve to reduce or prevent deterioration of the thin film transistors due to the alkali ions released from the array substrate 101 to an active layer for the thin film transistors during the crystallization process of the active layers.

Although not shown in FIG. 7F, the active layer is formed on the buffer layer 105. The active layer may be formed of pure polysilicon and selective etched to form an active layer pattern to correspond to a driving region (not shown) and a switching region (not shown) in each pixel within the display area (AA).

Although not shown in FIG. 7F, a gate insulating layer and a first metal material layer are sequentially deposited on the buffer layer 105 including the active layer pattern. The first metal material layer may be made of a first metal material having a low resistance characteristic, for example, any one of aluminum (Al), an aluminum alloy (AlNd), copper (Cu), a copper alloy, molybdenum (Mo), and molybdenum titanium (MoTi) with a single-layered structure, or may have a multi-layered structure in which two or more of the first metal materials are deposited one over the other. In FIG. 7F, the gate electrode and gate line (not shown) have a single-layered structure as an example.

Subsequently, the first metal material layer is selectively etched to form a gate electrode (not shown). At this time, a gate line (not shown) connected to the gate electrode formed in the switching region (not shown) and extended in one direction is formed on the gate insulating layer (not shown).

Next, although not shown in FIG. 7F, impurities are injected into the active layer pattern (not shown) under both sides of the gate electrode (not shown) to form a channel region (not shown) at a central portion of the active layer pattern (not shown) and a source region (not shown) and a drain region (not shown) that are separated from each other with the channel region (not shown) therebetween.

Next, although not shown in FIG. 7F, an interlayer insulating layer (not shown) made of, for example, an insulating material an inorganic insulating material, such as silicon oxide ($SiO_2$) or silicon nitride (SiNx) is formed on an entire surface of the display area including the gate electrode (not shown) and the gate line (not shown).

The interlayer insulation layer (not shown) and the gate insulating layer (not shown) thereunder are selectively etched to form a source region contact hole (not shown) and a drain region contact hole (not shown) for exposing the source and/or drain regions of the active layer pattern (not shown) at the same time.

Subsequently, a second metal material layer (not shown) is formed on the interlayer insulating layer and contacts the active layer pattern in the source and drain regions. The second metal material layer (not shown) may be formed of any one or more materials selected from aluminum (Al), aluminum alloy (AlNd), copper (Cu), a copper alloy, molybdenum (Mo), a molybdenum titanium (MoTi), chromium (Cr), and titanium (Ti).

Next, the second metal material layer (not shown) is selectively etched to form a data line (not shown) crossed with the gate line (not shown) to define the pixel region (not shown), and a power line (not shown) separated therefrom. Here, the power line (not shown) may be separated from the gate line (not shown) on a layer formed with the gate line (not shown), namely, a gate insulating layer, in parallel thereto.

At the same time, source and drain electrodes (not shown) separated from each other are formed in each driving region (not shown) and switching region (not shown) by the second metal material layer that is selectively etched and contacts the active layer pattern (not shown) in the source and drain regions, respectively, through the source region contact hole and drain region contact hole. The active layer pattern (not shown), the gate insulating layer (not shown) and the gate electrode that are sequentially layered in the driving region (not shown), as well as the source electrode (not shown) and drain electrode (not shown) that are separated from the interlayer insulating layer constitute the driving thin film transistor (DTr).

The data line (not shown), source electrode (not shown) and drain electrode (not shown) may have a single-layered or multi-layered structure. The driving thin film transistor (DTr) may have the same layered structure as that of the switching thin film transistor and be formed in the switching region (not shown). The switching thin film transistor (not shown) may be electrically connected to the driving thin film transistor (not shown), and the gate line (not shown) and data line (not shown). In other words, the gate line (not shown) and data line (not shown) are connected to the gate electrode (not shown) and source electrode (not shown) of the switching thin film transistor (not shown), respectively, and the drain electrode (not shown) of the switching thin film transistor (not shown) is electrically connected to a gate electrode 115a of the thin film transistor (T).

The OLED panel 110 is described with an example of the driving and switching thin film transistors that have an active layer pattern 109a formed of polysilicon and are configured with a top gate type. However, an OLED panel according to the present invention is not limited to these examples. Various types of thin film transistors can be used, including a thin film transistor that has a bottom gate type or an active layer pattern formed of amorphous silicon.

For example, when the driving thin film transistor is configured with a bottom gate type, the layered structure may include a source electrode and a drain electrode that are separated from a gate electrode through a gate insulating layer, and an active layer pattern formed of pure amorphous silicon. The active layer pattern may further include ohmic contact layers with amorphous silicon doped with impurities to improve electrical connection to the source and drain electrodes. The gate line connected to the gate electrode of the thin film transistor can be formed with the same layer as the gate electrode, and the data line connected to the source electrode can be formed with the same layer as the source electrode of the switching thin film transistor.

Referring back to FIG. 7F, a passivation layer 107 is then formed on an entire surface of the array substrate including the source electrode (not shown) and drain electrode (not shown). An insulating material of an inorganic insulating material, such as silicon oxide ($SiO_2$) or silicon nitride (SiNx), may be used for the passivation layer 107.

Next, the passivation layer 107 is selectively etched to form a drain contact hole (not shown) for exposing the drain electrode (not shown).

Subsequently, a conductive material layer (not shown) is deposited on the passivation layer 107, and then the conductive material layer is selectively etched through a mask process to form a first electrode 111 brought into contact with the drain electrode (not shown) of the thin film transistor (DTr) through the drain contact hole (not shown) in each pixel region. The conductive material layer (not shown) may be provided with a transparent electrode and a reflective electrode. The transparent electrode may be formed of ITO, IZO, ZnO or $In_2O_3$, and the reflective layer may be formed of Ag, Mg, Al, Pt, Pd, Au, Ni, Nd, Ir, Cr, and a compound thereof, and then ITO, IZO, ZnO or $In_2O_3$ may be formed thereon when used for the reflective electrode.

Next, an insulating material layer (not shown) made of, for example, benzocyclobutene (BCB), polyimide or photo acryl is formed at a boundary region of each pixel region on the first electrode 111.

Subsequently, the insulating material layer (not shown) is selectively patterned through a mask process to form a pixel defining layer 113. Here, the pixel defining layer 113 overlaps an edge of the first electrode 111 and surrounds each pixel region, and form a lattice shape having a plurality of opening portions over an entire display area (AA).

Next, an organic light-emitting layer 115 for emitting red, green and blue lights is formed on the first electrode 111 within each pixel region surrounded by the pixel defining layer 113. The organic light-emitting layer 115 may be configured with a single layer made of an organic light-emitting material, or configured with multiple layers made of, for example, a hole injection layer, a hole transporting layer, an emitting material layer, an electron transporting layer, and an electron injection layer to enhance light-emitting efficiency.

Subsequently, a second electrode 117 is formed on an entire surface of the display area (not shown) including an upper portion of the organic light-emitting layer 115 and the pixel defining layer 113. The second electrode 117 is may be provided with a transparent electrode or reflective electrode. Since the second electrode 117 is used as a cathode electrode when used for a transparent electrode, a metal with a low work function, namely, Li, Ca, LiF/Ca, LiF/Al, Al, Ag, Mg, and a compound thereof, is deposited in a direction of the organic light-emitting layer 115, and then an auxiliary electrode layer or bus electrode line made of a material for forming a transparent electrode such as ITO, IZO, ZnO or $In_2O_3$ may be formed thereon. Furthermore, when used for a reflective electrode, Li, Ca, LiF/Ca, LiF/Al, Al, Ag, Mg, and a compound thereof is deposited and formed thereon as a whole.

Accordingly, the first electrode 111 connected to the drain electrode (not shown) of the thin film transistor to supply plus power therefrom, the second electrode 117 provided to cover the pixel to supply minus power, and the organic light-emitting layer 115 between the first electrode 111 and second electrode 117 to emit light constitute the organic light-emitting diode (E) of the OLED panel 110, which emits red, green and blue lights by controlling the flow of current, thereby displaying an image.

The first electrode 111 and second electrode 117 are insulated from each other by the organic light-emitting layer 115, and a different polarity of voltage is applied to the organic light-emitting layer 115 to emit light.

When a predetermined voltage is applied to the first electrode 111 and second electrode 117 according to the selected color signal, holes injected from the first electrode 111 and electrons provided from the second electrode 117 are transported to the organic light-emitting layer 115 to form excitons, and light is generated and emitted in a visible light spectrum when such excitons are transitioned from an excited state to a lower energy state. At this time, the light emitted from the organic light-emitting layer 115 passes through the transparent second electrode 117 so that the OLED panel 110 displays an image.

Next, an adhesive layer 121 is formed on an entire surface of the array substrate including the organic light-emitting diode (E). The adhesive layer 121 may include an inorganic insulating material and/or an organic insulating material having an adhesive characteristic to protect the second electrode 117 of the organic light-emitting diode (E) and the organic light-emitting layer 115 from moisture permeation. In other words, the OLED panel 110 is encapsulated through the adhesive layer 121, thereby completing the OLED panel 110 according to an embodiment of the present invention.

Subsequently, the touch panel 150 is adhered to the OLED panel 110 on which the driving and switching thin film transistors and the organic light-emitting diode (E) are formed through the adhesive layer 121, thereby completing the OLED 100 having the touch panel 150 according to an embodiment of the present invention. The adhesive layer 121 is formed on the organic light-emitting diode (E) of the OLED panel 110 by, for example, a coating method.

A polarizing plate 160 may be formed on an outer surface of the touch panel 150 through an additional protective or encapsulation layer 143 to block external light incident toward a transmission direction of the light emitted from the organic light-emitting layer 115 of the OLED panel 110.

In a method for fabricating an OLED having a touch panel according to an embodiment of the present invention, a plurality of touch contact holes are formed to be located at substantially the same distance from a cell end line, regardless of its shape, whether rectangular or circular type cell end line, thereby enhancing reliability relating to external moisture permeation through the touch contact holes.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An organic electroluminescent device (OLED) having a display area and a non-display area outside the display area, the device comprising:
    an OLED panel including a plurality of organic light-emitting diodes in a cell end line of the display area on an array substrate; and
    a touch panel on the OLED panel, the touch panel including a plurality of touch contact holes in the non-display area,
    wherein at least two of the plurality of touch contact holes that are immediately adjacent to each other and the cell end line have substantially the same distance from the cell end line, and
    wherein the touch panel further comprises a touch substrate, and the plurality of touch contact holes pass through the touch substrate.

2. The device of claim 1, wherein the OLED panel and the touch panel are adhered to each other using an adhesive that reduces moisture permeation.

3. The device of claim 1, the touch panel further comprising a plurality of upper touch electrodes and a plurality of lower touch electrodes that are respectively provided on upper and lower surfaces of the touch substrate.

4. The device of claim 3, the touch panel further comprising a lower touch electrode connection pattern on the upper surface of the touch substrate, and wherein the lower touch electrode connection pattern is electrically connected to one of the plurality of lower touch electrodes through one of the plurality of touch contact holes.

5. The device of claim 4, the touch panel further comprising an electrode-connecting plug that passes through the one of the plurality of touch contact holes.

6. The device of claim 4, wherein the lower touch electrode connection pattern is formed around the one of the plurality of touch contact holes.

7. The device of claim 4, wherein the electrode-connecting plug is formed by an electroplating method.

8. The device of claim 1, wherein the cell end line of the display area has a rectangular or circular shape.

9. The device of claim 1, wherein the at least two of the plurality of touch contact holes are located so as to follow a contour of a corresponding portion of the cell end line.

10. A method of fabricating an organic electroluminescent device (OLED) having a display area and a non-display area outside the display area, the method comprising:
    forming an OLED panel including a plurality of organic light-emitting diodes on an array substrate;
    forming a plurality of touch contact holes passing through a touch substrate in the non-display area, the plurality of touch contact holes located at substantially the same distance from a cell end line of the display area;
    forming an upper touch electrode and a lower electrode at upper and lower surfaces of the touch substrate, respectively;
    forming a lower touch electrode connection pattern electrically connected to a lower touch electrode of the touch panel through one of the plurality of touch contact holes; and
    adhering the OLED panel to the touch substrate using an adhesive.

11. The method of claim 10, wherein the lower touch electrode connection pattern is formed on the upper surface of the touch substrate around the one of the plurality of touch contact holes.

12. The method of claim 10, wherein the cell end line of the display area has a linear, rectangular or circular shape.

13. The method of claim 10, wherein an upper touch electrode and a lower touch electrode formed at an upper and a lower portion of the touch substrate of the touch panel constitutes a touch sensor.

14. The method of claim 10, further comprising forming an electrode-connecting plug that passes through the one of the plurality of touch contact holes.

15. The method of claim 14, wherein the electrode-connecting plug is formed by an electroplating method.

* * * * *